Fig. I.

INVENTOR
William K. Sonnemann

March 15, 1966 W. K. SONNEMANN 3,240,998
PROTECTIVE RELAYING ASSEMBLY
Filed July 17, 1962 3 Sheets-Sheet 2

United States Patent Office 3,240,998
Patented Mar. 15, 1966

3,240,998
PROTECTIVE RELAYING ASSEMBLY
William K. Sonnemann, Roselle Park, N.J., assignor to Westinghouse Electric Corporation, East Pittsburgh, Pa., a corporation of Pennsylvania
Filed July 17, 1962, Ser. No. 210,352
7 Claims. (Cl. 317—36)

This invention relates to a protective relaying assembly and it has particular relation to such an assembly which discriminates between faults occurring on a system to be protected in accordance with the distance of the faults from a relaying station and which has a substantial time delay in operation. Relays having such characteristics are referred to as time distance relays.

In accordance with the invention an electric storage device, preferably a capacitor, is charged in accordance with current flowing in an electric system to be protected. When a fault occurs on the electric system to be protected, a substantial fault current flows in the system. Consequently, under these circumstances a substantial charging current is supplied to the capacitor. Desirably, the capacitor is discharged immediately after a fault occurs on the electric system in order to make available thereafter a full charging operation of the capacitor.

The voltage appearing across the capacitor is compared with the voltage present in the electric system to be protected. When the voltage across the capacitor exceeds a predetermined percentage of the voltage of the electric system to be protected a suitable protective operation such as the tripping of a circuit breaker is initiated.

Inasmuch as the voltage and current at the relaying station of the system to be protected depend on the distance of the fault from the relaying station it follows that the invention provides a distance relaying operation. Furthermore, the capacitor introduces a time delay. Thus, a time distance relaying operation is inherent in the system thus far described. An instantaneous distance response also may be incorporated in the system. In accordance with a further aspect of the invention, the system may be designed to provide the above-mentioned protective operation only for a flow of power in the system to be protected in a predetermined direction. Preferably, the components employed in the system are of static construction.

It is therefore an object of the invention to provide an improved time distance relaying system of static construction.

It is also an object of the invention to provide an improved relaying system wherein a capacitor is charged in accordance with current flowing in a system to be protected and wherein a relaying operation is dependent on the relationship between the voltage across the capacitor and a voltage of the system to be protected.

It is another object of the invention to provide a relaying system as set forth in the preceding paragraph wherein the capacitor is discharged prior to each effective operation thereof.

Other objects of the invention will be apparent from the following description taken in conjunction with the accompanying drawings, in which.

The electric system to be protected may be of various types. For example, it may be either a polyphase or a single phase electric system. For present purposes it will be assumed that the electric system to be protected is a single phase transmission line having line conductors L1 and L2 and designed for operation at a power frequency such as 60 cycles per second. A circuit breaker CB is provided for segregating portions of the transmission line. This circuit breaker is shown in its closed condition and has a trip coil TC and an auxiliary switch CB1 which is closed when the circuit breaker is in closed condition and which is open when the circuit breaker is in open condition.

In accordance with a preferred embodiment of the invention, a first direct voltage $E_i$ is derived which is dependent on the line current flowing in the electric system to be protected. A second direct voltage $E_e$ is derived which is dependent on the voltage across the line conductors L1 and L2. The voltage $E_i$ is applied across a capacitor C3 through an adjustable resistor R3.

Figure 1:
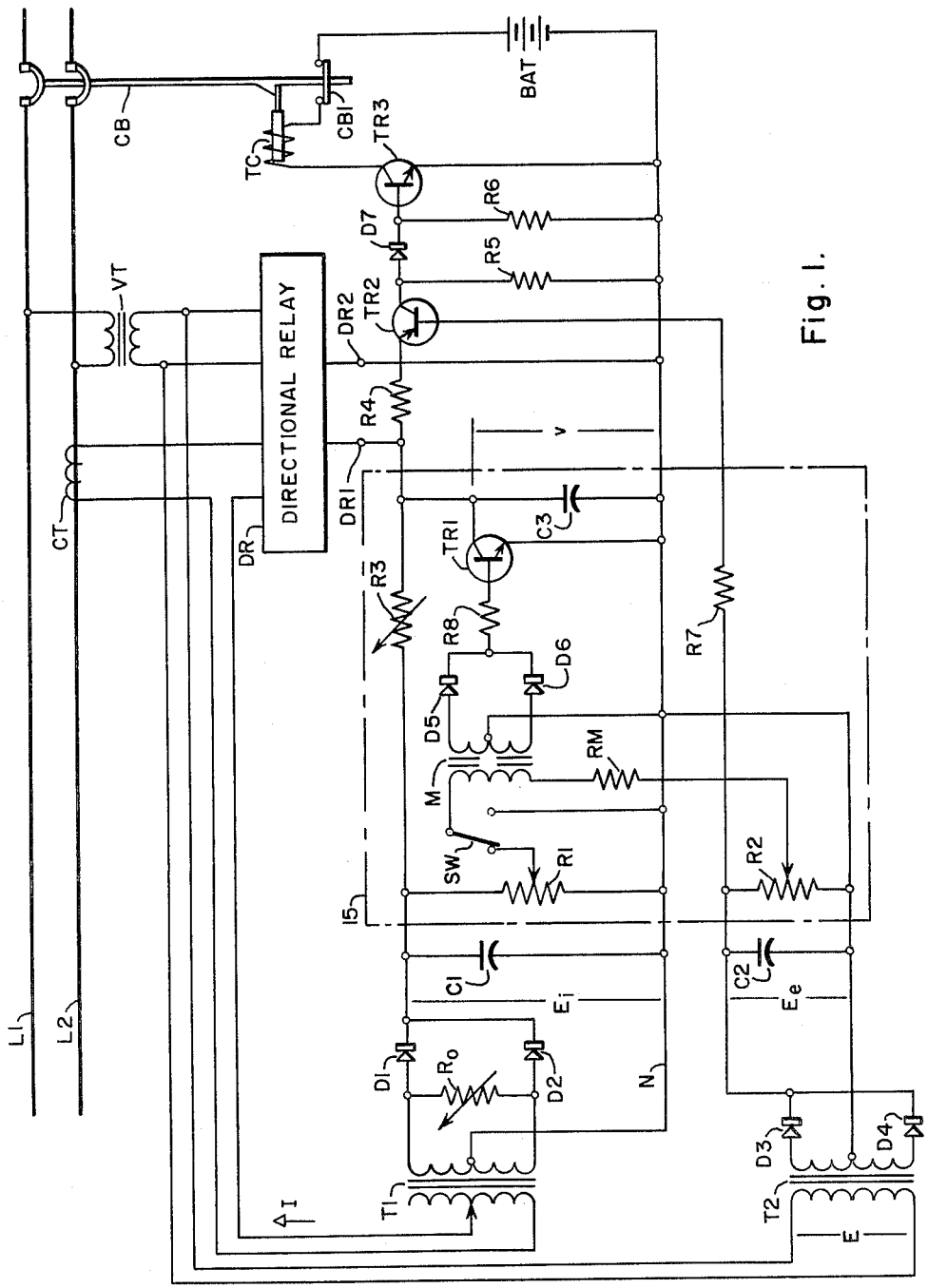
FIGURE 1 is a schematic view of an electric system embodying the invention.

The voltage $v$ appearing across the capacitor C3 is compared with the voltage $E_e$. When the voltage across the capacitor exceeds the voltage $E_e$ a protective operation is initiated. In FIG. 1, this protective operation results in the tripping of the circuit breaker CB.

If a directional control of the protective operation is desired, a directional relay DR receives voltage energization from the secondary winding of a voltage transformer VT which has its primary winding connected across the conductors L1 and L2. The directional relay receives current energization through the secondary winding of a current transformer CT associated with the line conductor L2. When the flow of power in the transmission line is in a non-tripping direction, the directional relay establishes a conductive path between its output terminals DR1 and DR2 to shunt the capacitor C3. This prevents the voltage $v$ from building up. If the flow of power in the transmission line is in the tripping direction, the directional relay maintains an open circuit between the output terminals DR1 and DR2 to permit charging of the capacitor C3. Directional relays controlling the conductivity between the output terminals DR1 and DR2 in this manner are well understood in the art.

The voltage $E_e$ is derived through a transformer T2 which has its primary winding connected for energization across the secondary winding of the transformer VT. The output of the secondary winding of the transformer T2 is rectified preferably by a full wave rectifier to provide the voltage $E_e$. In the specific embodiment of FIG. 1, a center tap on the secondary winding of the transformer T2 is connected to the lower terminal of a resistor R2. The terminals of the secondary winding of the transformer T2 are connected respectively through rectifiers D3 and D4 to the upper terminal of the resistor R2. A filter capacitor C2 is connected across the resistor R2 for the purpose of removing ripple from the output of the associated rectifier. Thus, the rectified output of the transformer T2 establishes a substantially ripple-free direct voltage $E_e$ across the resistor R2.

The direct voltage $E_i$ is derived through a transformer T1 which has an adjustable primary winding connected in series with the current input terminals of the directional relay DR across the secondary winding of the current transformer CT. For some applications, the transformer T1 may take the form of a mutual reactor. However, a current transformer construction of conventional type is suitable and will here be assumed to be employed as the transformer T1. An adjustable load resistor R0 is connected across the secondary winding of the transformer T1.

The voltage $E_i$ is derived from the transformer T1 through a rectifier which preferably is a full wave rectifier. In the specific embodiment of FIG. 1, a center tap on the secondary winding of the transformer T1 is connected through a negative bus N to the lower negative terminal of a resistor R1. The terminals of the secondary winding are connected respectively through rectifiers D1 and D2 to the positive upper terminal of the resistor R1. A filter capacitor C1 is connected across the resistor R1 for the purpose of removing ripple from the output of the associated rectifier. Thus, a substantially smooth direct voltage $E_i$ is derived which is dependent on line current flowing in the system to be protected.

As previously pointed out the voltage $E_i$ is applied across the capacitor C3 through an adjustable resistor R3. Consequently, the voltage $v$ builds up at a rate depending on the value of capacitance of the capacitor C3, the magnitude of the resistance of the resistor R3 and the magnitude of the voltage $E_i$ which in turn is dependent on the magnitude of line current flowing in the system to be protected.

As previously pointed out, the difference between the voltage $v$ and the voltage $E_e$ is employed for controlling a protective operation such as the tripping of the circuit breaker CB. If the trip coil TC of the circuit breaker has adequate sensitivity this difference may be applied directly across the trip coil. However, in a preferred embodiment of the invention, the difference is applied to the input of a suitable amplifier which in the embodiment of FIG. 1 includes a transistor TR2. The input circuit for the transistor TR2 may be traced from the upper terminal of the capacitor C3 through a resistor R4 the emitter and base of the transistor TR2, a resistor R7 and the resistor R2 to the lower terminal of the capacitor C3. As long as the voltage $E_e$ exceeds the voltage $v$ the base of the transistor TR2 is positive relative to the associated emitter. Inasmuch as the transistor TR2 is assumed to be of the P-N-P type the transistor remains turned off.

When the voltage $v$ increases to a magnitude exceeding that of the voltage $E_e$, the transistor TR2 turns on and the capacitor C3 discharges through the resistor R4, the emitter and collector of the transistor TR2 and the resistor R5. In addition, the voltage across the resistor R5 is applied through a rectifier D7 across a resistor R6.

By inspection of FIG. 1, it will be noted that the resistor R6 is in the input circuit of a transistor TR3 which is assumed to be of the N-P-N type. The voltage across the resistor R6 is poled to turn on the transistor TR3. Current now flows from the positive terminal of the source of direct voltage represented by a battery BAT through the auxiliary switch CB1, the trip coil TC, the collector and emitter of the transistor TR3 to the negative terminal of the battery. This results in a tripping operation of the circuit breaker CB.

It will be recalled that prior to an effective operation of the capacitor C3, it is desirable to discharge the capacitor. This permits any timing operation of the capacitor C3 to start from a reset or substantially discharged condition of the capacitor. For this purpose, an electroresponsive switch is connected across the capacitor C3. In the specific embodiment of FIG. 1, the switch takes the form of a transistor TR1 of the N-P-N type having its collector and emitter connected respectively to the terminals of the capacitor.

The transistor TR1 is turned on to discharge the capacitor C3 in response to a change in some condition of the system to be protected which takes place when a fault occurs on the system. Such a change may be represented by the increase in line current or the decrease in line voltage which accompanies the occurrence of a fault. When the system to be protected reaches a steady fault condition the transistor TR1 turns off to permit a charging operation of the now-discharged capacitor C3.

In a preferred embodiment of the invention the control of the transistor TR1 is effected through a mutual reactor M. This mutual reactor has a primary winding which has its upper terminal connected through a single-pole double-throw switch to a tap on the resistor R1 and which has its lower terminal connected through a resistor RM to a tap on the resistor R2. Thus, the primary winding is energized in accordance with the difference between a selected part of the voltages $E_i$ and a selected part of the voltage $E_e$.

The output of the secondary winding of the mutual reactor M is applied across the base and emitter of the transistor TR1 but preferably is first rectified. To this end a center tap on the secondary winding is connected to the emitter of the transistor TR1. The terminals of the secondary winding are connected respectively through rectifiers D5 and D6 and through a resistor R8 to the base of the transistor TR1.

When a fault occurs on the system to be protected a change occurs in the quantity $E_i - E_e$ and consequently, a change occurs in current flowing through the primary winding of the mutual reactor M. This change induces a voltage in the secondary winding of the mutual reactor. The output of the secondary winding is rectified and applied through the resistor R8 across the base and emitter of the transistor TR1 to turn the transistor on. This discharges the capacitor C3. When the voltage and current of the system to be protected reach their steady fault values, a steady direct current flows through the primary winding of the mutual reactor M and the output of the secondary winding of the mutual reactor falls to zero. This turns off the transistor TR1 and permits the capacitor C3 to charge.

If desired, the primary winding of the mutual reactor M may be energized in accordance with line current or line voltage alone. For example, if the switch SW is operated to its right-hand position as viewed in FIG. 1, the primary winding of the mutual reactor M is connected through the resistor RM across a selected portion of the resistor R2. The primary winding now is energized in accordance with the voltage $E_e$. Therefore, any change in the value of the voltage $E_e$ due to a change in system conditions, such as the occurrence of a fault, results in a discharge of the capacitor C3.

To illustrate energization of the primary winding of the mutual reactor M in accordance with line current alone the switch SW may be left in the position shown in FIG. 1 and the slider or adjustable tap on the resistor R2 may be moved to its lowest position as viewed in FIG. 1.

This effectively removes the resistor R2 from the primary circuit of the mutual reactor, and connects the primary winding of the mutual reactor and the resistor RM between the tap on the resistor R1 and the bus N. The primary winding of the mutual reactor now is energized by a selected part of the voltage across the resistor R1 and consequently is energized in accordance with line current alone.

The overall operation of the system of FIG. 1 now will be reviewed. Let it be assumed first that power flows in the system to be protected in a non-tripping direction. Under such circumstances the directional relay operates to establish a shunt across the capacitor C3 to prevent a tripping operation of the circuit breaker CB.

Let it be assumed next that the system to be protected carries normal load current in a tripping direction. Under such circumstanecs, the voltage $E_i$ establishes a charge in the capacitor C3 but the voltage $v$ across the capacitor remains smaller than the voltage $E_e$. Under these circumstances the difference between the voltage $v$ and the voltage $E_e$ maintains the transistor TR2 in its cutoff condition and no tripping operation of the circuit breaker CB can take place.

Should a fault occur on the system to be protected in which power flows in the tripping direction the line current increases and the line voltage drops. This results in a decrease in the voltage $E_e$ and an increase in the voltage $E_i$. The resultant change in current flowing through the primary winding of the mutual reactor M turns on the transistor TR1 to discharge the capacitor C3.

Shortly thereafter, the line current and line voltage reach their steady fault values. Since the current through the primary winding of the mutual reactor M is now a steady direct current, the transistor TR1 turns off to permit charging of the capacitor C3. This capacitor charges at a rate dependent on the magnitude of the line current, the magnitude of the resistance of the resistor R3 and the capacitance value of the capacitor C3. The voltage $v$ across the capacitor C3 now starts to increase. If the fault occurs at a point beyond the reach of the relay, the voltage $v$ does not achieve a value greater than the value of the voltage $E_e$ with which it is compared and the transistor TR2 remains turned off. Under these circumstances no tripping operation of the circuit breaker CB takes place.

Should the fault occur on the system within the reach of the relay the voltage $v$ finally reaches a value in excess of the value of the voltage $E_e$. The difference between these voltages now has a polarity suitable for turning on the transistor TR2. The resultant discharge of the capacitor C3 through the transistor TR2 turns on the transistor TR3 to trip the circuit breaker CB.

Figure 4:
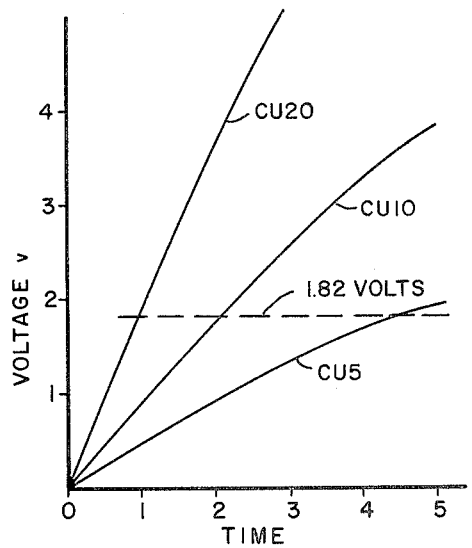
FIG. 4 is a graphic representation of curves useful in explaining the invention.

The performance of the system of FIG. 1 may be discussed further with reference to the graphic representation in FIG. 4. In FIG. 4 the voltage $v$ across the capacitor C3 is plotted as ordinates against time as abscissas. The curve CU5 illustrates the build up of the voltage $v$ with respect to time for one adjustment of the system. If the adjustment is changed in such a manner that for a given line current the voltage $E_i$ is twice as great as the value represented by the curve CU5, a new curve CU10 is obtained for the relationship between the voltage $v$ and time. As a further example if the sensitivity again is changed in such a manner that for a given line current the voltage $E_i$ is twice as large as it would be for the curve CU10, a new curve CU20 is provided for the relationship between the voltage $v$ and time.

Let it be assumed that for a given fault condition the voltage $E_e$ has a value of 1.82 volts. The curves CU5, CU10 and CU20 show that the time required for the voltage $v$ to reach the value of 1.82 volts is respectively 4.5, 2 and 0.95 seconds. If the three curves CU5, CU10, CU20 correspond to distances to the fault in the ratios of 4:2:1, the time values required by these curves to yield $V=1.82$ volts show that the relation between time and distance is non-linear. For a linear relation, the three values of time would be say 4, 2 and 1 seconds instead of the illustrated values of 4.5, 2 and 0.95 seconds respectively. Thus, the time distance relation is not quite linear but the slight bend in the relation is a desirable feature.

The curves in FIG. 4 have the well known logarithmic shapes. By confining the operation of the system to the lower portions of the curves, the portions used can be substantially straight.

If the time constant for the circuit associated with the capacitor C3 is large the relationship between time and distance of a fault from the relaying station is close to a straight line for short time and distance settings.

If $t$ is a time required for a tripping operation following the occurrence of a fault, C is the capacitance of the capacitor C3, R is the resistance in the charging circuit of the capacitor C3, $K_1$ is a design constant for the transformer T1 associated with transformer ratio, $K_2$ is a design constant for the transformer T2 associated with transformer ratio and Z is the line impedance from the relaying station to the point of fault it can be shown that:

$$t = RC \log e \frac{K_1}{K_1 - K_2 Z}$$

if the time constant RC is large and the constant $K_2$ is small compared to the value of $K_1$ a nearly straight line relationship between $t$ and impedance or distance Z is obtained for short time and distance settings. If $Z_L$ represents load impedance then $K_2 Z_L$ should be greater than $K_1$ to prevent an undesirable tripping operation under normal load conditions. A cutoff point for the reach of the relay is represented by a value of impedance $$Z = \frac{K_1}{K_2}$$

In the impedance relay field, it is the practice to plot an impedance circle on coordinate axes wherein ordinates represent reactance and abscissas represent resistance. The impedance circle represents an area of impedance values which result in a tripping operation. The system of FIG. 1 as thus far described would yield an impedance circle having its center at the origin of the resistance and reactance axes. If desired, compensating networks may be employed for the voltage and current energizing circuits to permit shifting of the impedance circle relative to the resistance and reactance axes, and such a system is shown in FIG. 5.

Figure 5:
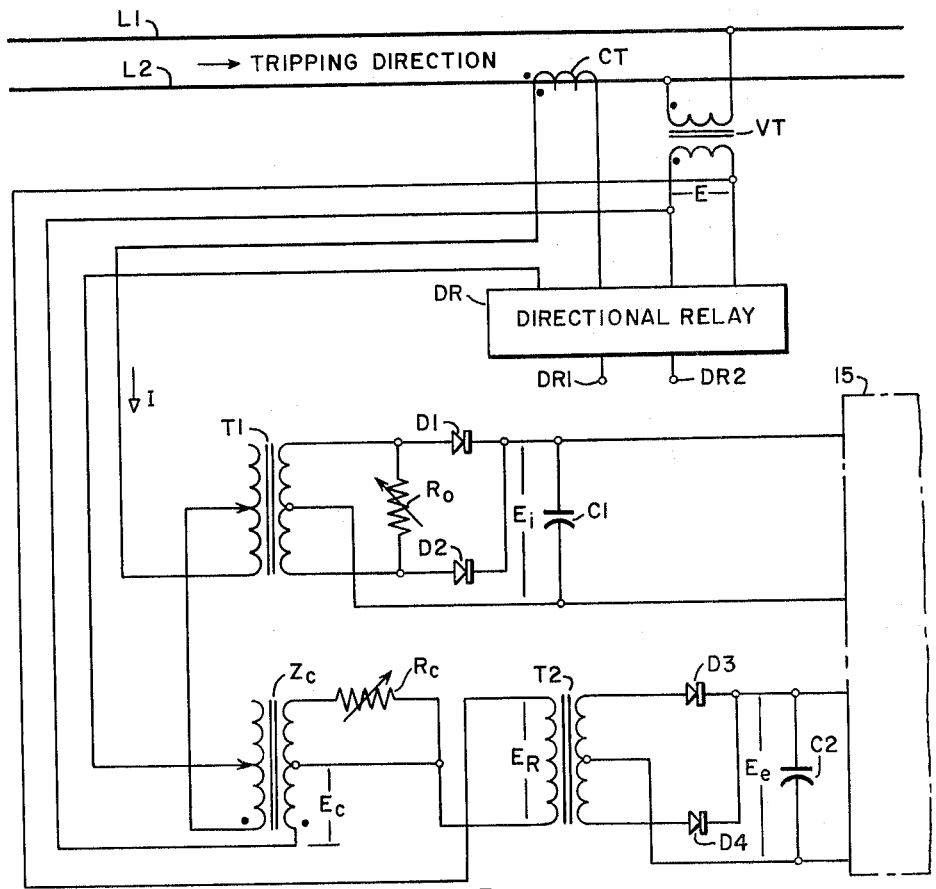
Figure 6:
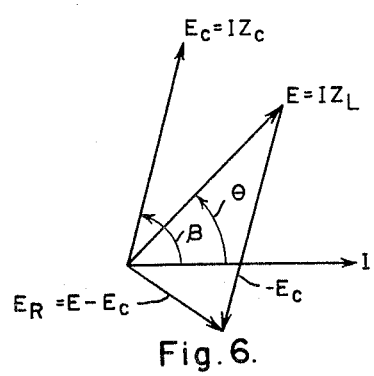
FIG. 6 is a phasor representation useful in understanding the modification of FIG. 5.

The system of FIG. 5 is similar to that of FIG. 1 except for the energization of the transformer T2. It will be noted that a compensator $Z_c$ is employed in FIG. 5 for modifying the energization of the primary winding of the transformer T2. This compensator has a tapped adjustable primary winding with a small number of turns connected in series with the primary winding of the transformer T1 for energization from the current transformer CT in accordance with line current. The compensator has a secondary winding providing a large number of turns coupled to the primary winding through a magnetic core having an air gap. The compensator voltage $E_c$ derived from the secondary winding is displaced in phase from the current in the primary winding of the compensator by 90°, or less, dependent on the adjustment of an adjustable resistor $R_c$ connected across a portion of the compensator secondary winding. Compensators are discussed in my United States Patents 2,973,459, issued February 28, 1961, and 2,426,062, issued August 19, 1947. The primary winding of the transformer T2 is supplied with a voltage $E_r$ which is equal to the difference between a voltage E derived from the transmission line through the voltage transformer VT and the compensator voltage $E_c$. Polarity marks are shown in a conventional manner for the transformers CT and VT and for the compensator $Z_c$.

It can be shown that:

$$\left(\frac{K_1}{K_2}\right)^2 = Z_1^2 + Z_c^2 - 2Z_1 U_c \cos(\theta - \beta)$$

wherein $$K_1 = \frac{E_i}{I}$$

$$K_2 = \frac{E_e}{E_r}$$

$Z_1$=line impedance to fault in terms of transformer secondary $$Z_c = \frac{E_c}{I}$$

$\beta$=phase displacement between $E_c$ and I.
$\theta$=phase displacement between E and I.

This equation represents a circle on the conventional reactance and resistance coordinate axes having a radius $K_1/K_2$ and having a center displaced from the intersection of the coordinate axes by $Z_c$.

In FIG. 1, the resetting of the capacitor C3 is initiated by various changes in voltages and currents of the system to be protected. In many cases it suffices to provide such resetting only in response to an increase in line current of the system to be protected. Such a modification is illustrated by the circuits shown in the dotted rectangle 15A of FIG. 2 which are intended to replace the circuits shown in the dotted rectangle 15 of FIG. 1.

Figure 2:
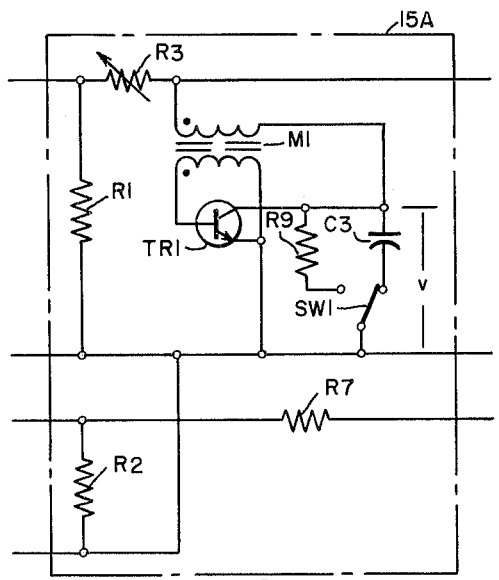
FIGS. 2, 3 and 5 are schematic views showing modifications of the electric system illustrated in FIG. 1.

In FIG. 2 the voltage appearing across the resistor R1 is applied across the capacitor C3 through the resistor R3 the primary winding of a mutual reactor M1 and a single-pole double-throw switch SW1. The voltage appearing across the primary winding of the mutual reactor M1 and the capacitor C3 is applied across the emitter and base of the transistor TR2 of FIG. 1 through the resistor R4. In FIG. 2 the transistor TR1 again is employed to discharge the capacitor C3. However, the secondary winding of the mutual reactor M1 is connected across the base and emitter of the transistor TR1. Conventional polarity markings are shown for the windings of the mutual reactor M1.

If the line current of the system to be protected increases following the occurrence of a fault on the system, the resulting increase of current through the primary winding of the mutual reactor M1 produces a pulse in the secondary winding which is properly poled to turn on the transistor TR1. Consequently, the transistor TR1 discharges the capacitor C3. When the line current thereafter reaches a steady fault value the voltage across the secondary winding of the mutual reactor M1 drops to zero and the transistor TR1 turns off to permit a charging operation of the capacitor C3. When the voltage $v$ across the capacitor C3 plus the slight additional voltage drop across the primary winding of the mutual reactor M1 exceeds the voltage $E_e$ across the resistor R2, the transistor TR2 (FIG. 1) turns on to initiate a tripping operation of the associated circuit breaker.

If an instantaneous tripping operation is desired, the switch SW1 may be operated to its left position as shown in FIG. 2 to replace the capacitor C3 by a resistor R9. When the resistor R9 is employed the transistor TR1 and the mutual reactor M1 are superfluous and may be omitted if desired. Inasmuch as the voltage $v$ across the resistor R9 directly represents the line current of the system to be protected, when the line current reaches a fault value, a prompt tripping operation of the circuit breaker CB is obtained.

Figure 3:
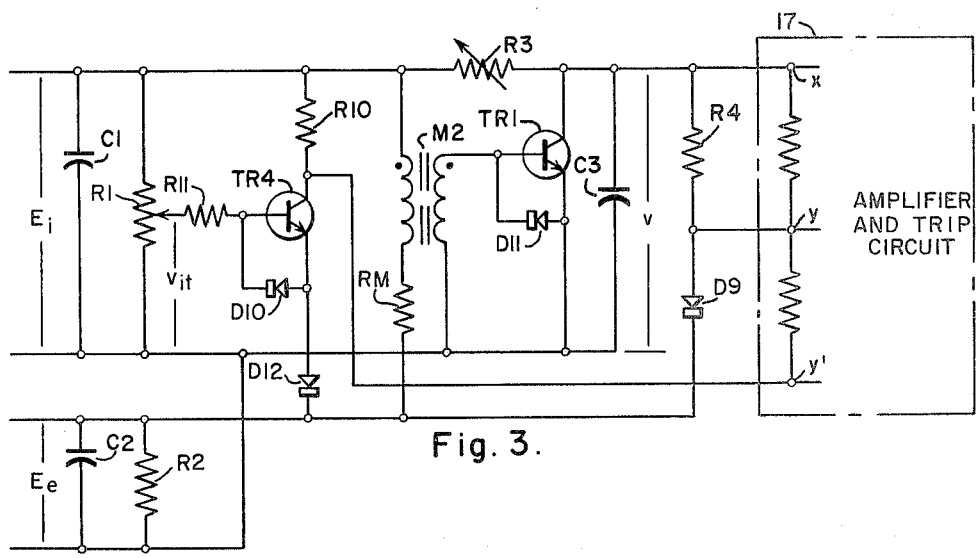

In FIG. 3 the charging circuit for the capacitor C3 and the circuits for developing the voltages $E_i$ and $E_e$ across the resistors R1 and R2 are similar to those shown in FIG. 1. However, the resetting of the capacitor is accomplished in a different manner.

In FIG. 3 the primary winding of the mutual reactor M2 is connected through the resistor RM for energization in accordance with the difference between the voltages $E_i$ and $E_e$. The secondary winding of the mutual reactor M2 is connected across the base and emitter of the transistor TR1 which is again employed for discharging the capacitor C3. Suitable polarity markings are shown in a conventional manner for the windings of the mutual reactor. Any increase in the ratio $E_i$ to $E_e$ produces a pulse in the secondary winding of the mutual reactor M2 which turns on the transistor TR1 to discharge the capacitor C3. Oppositely poled pulses in the secondary winding of the mutual reactor M2 are bypassed around the transistor TR1 through a rectifier D11. The mutual reactor M2 may be provided with a magnetic core having an air gap and constructed of laminations of transformer iron in a conventional manner.

In some systems, it is possible for a fault condition to result in a lowering of the line current at the relaying station and an increase of the line voltage at the relaying station. This, for example, may be occasioned by the opening of one of several circuit breakers employed in the system. Under such circumstances, the system of FIG. 3 may not reset the capacitor C3.

If desired, the magnetic core of the mutual reactor M2 may be constructed of a square loop hysteresis material.

If the system is carrying a substantial load current it is possible for the capacitor C3 to have a substantial charge at the time a fault occurs on the system. Under such circumstances it is desirable that the capacitor C3 be discharged before the voltage $E_e$ can descend to a value below that existing across the capacitor C3 at the time the fault occurred on the system. For applications in which this may occur the capacitor C2 and the resistor R2 may be designed to have a relatively long time constant while the capacitor C1 together with the resistance of the secondary winding of the transformer T1 have a relatively short time constant.

In FIG. 3 the difference between the voltage $v$ across the capacitor C3 and the voltage $E_e$ is applied across the resistor R4 and a diode or rectifier D9. As long as the voltage $E_e$ exceeds the voltage $v$, the rectifier or diode D9 blocks the flow of current through the resistor R4. However, if the voltage $v$ exceeds the voltage $E_e$ current flows through the resistor R4 and the diode D9 and the voltage across the resistor is applied to the input terminals $x$, $y$ of an amplifier 17. The output of the amplifier is employed for tripping the circuit breaker CB.

FIG. 3 also shows an instantaneous tripping arrangement wherein an adjustable voltage $v_{it}$ is obtained across an adjustable part of the resistor R1. The difference between this voltage and the voltage $E_e$ is applied across the base and emitter of a transistor TR4 through a resistor R11 and a diode or rectifier D12. The transistor is assumed to be of the N-P-N type.

As long as the voltage $E_e$ is larger than the voltage $v_{it}$ the transistor TR4 remains turned off. For close-in faults the voltage $v_{it}$ exceeds the voltage $E_e$ and turns on the transistor TR4. The difference between the voltages $E_i$ and $E_e$ now directs a current through a resistor R10, the collector and emitter of the transistor TR4 and the rectifier D12. The voltage across the resistor R10 is applied through the resistor R3 to the input terminals $x$, $y'$ of the amplifier 17 to initiate a tripping operation of the circuit breaker. A diode D10 shunts reverse pulses around the emitter base circuit of the transistor TR4.

Although the invention has been described with reference to certain specific embodiments thereof numerous modifications falling within the spirit and scope of the invention are possible.

I claim as my invention:

1. In a protective relay assembly, a first pair of terminals, a second pair of terminals, means for deriving from current supplied to the first pair of terminals a first direct voltage having a magnitude dependent on the magnitude of current flowing through the first pair of terminals, means for deriving from a voltage across said second pair of terminals a second direct voltage having a magnitude dependent on the magnitude of the voltage across the second pair of terminals, a capacitor, circuit means connecting the capacitor for energization in accordance with the first direct voltage, said circuit means including substantial resistance whereby the circuit means and capacitor provide a time-delay circuit, discharge means responsive to a predetermined change in current flowing through said first pair of terminals for substantially discharging said capacitor, and translating means responsive to the difference between the voltage across said capacitor and the second direct voltage, said discharge means comprising a transformer having a primary winding, means for energizing the primary winding by direct current dependent on current flowing through the first pair of terminals, an electroresponsive switch operable for shunting said capacitor, said transformer having a secondary winding connected to energize the electroresponsive switch for shunting the capacitor in response to an increase in the direct current supplied to said primary winding.

2. In a protective relay assembly, a first pair of terminals, a second pair of terminals, means for deriving from the current supplied to the first pair of terminals a first direct voltage having a magnitude dependent on the magnitude of current flowing through the first pair of terminals, means for deriving from a voltage across said second pair of terminals a second direct voltage having a magnitude dependent on the magnitude of the voltage across the second pair of terminals, a capacitor, circuit means connecting the capacitor for energization in accordance with the first direct voltage, said circuit means including substantial resistance whereby the circuit means and capacitor provide a time-delay circuit, discharge means responsive to a predetermined change in current flowing through said first pair of terminals for substantially discharging said capacitor, and translating means responsive to the difference between the voltage across said capacitor and the second direct voltage, said discharge means comprising a transformer having a primary winding and a secondary winding, means for energizing the primary winding by direct current dependent on current flowing through the first pair of terminals, a transistor having an output circuit connected to shunt said capacitor, a full wave rectifier, said transistor having an input circuit connected for energization from the secondary winding through the full-wave rectifier, whereby any change in current through the primary winding turns the transistor on to discharge the capacitor.

3. In an energy-storage system, a capacitor, an electroresponsive switch having an output circuit operable between an electrically-closed and an electrically-open condition connected across said capacitor and a polarity-sensitive input circuit responsive to a predetermined polarity of input current for transferring said output circuit from one to the other of said conditions, a transformer having a primary winding and a secondary winding, and a full-wave rectifier circuit connecting the input circuit to the secondary winding to supply electric current of said predetermined polarity to the input circuit, whereby any change of current in the primary winding transfers the output circuit of the switch from one to the other of said conditions.

4. In a protective relay assembly, a first pair of terminals, a second pair of terminals, means for deriving from current supplied to the first pair of terminals a first direct voltage having a magnitude dependent on the magnitude of current flowing through the first pair of terminals, means for deriving from a voltage across said second pair of terminals a second direct voltage having a magnitude dependent on the magnitude of the voltage across the second pair of terminals, a capacitor, circuit means connecting the capacitor for energization in accordance with the first direct voltage, said circuit means including substantial resistance whereby the circuit means and capacitor provide a time-delay circuit, discharge means responsive to a predetermined change in current flowing through said first pair of terminals for substantially discharging said capacitor, and translating means response to the difference between the voltage across said capacitor and the second direct voltage, a directional relay, and means responsive to a predetermined operation of the directional relay for establishing a shunt across said capacitor.

5. A protective relay assembly designed to be energized in accordance with the alternating voltage and alternating line current of an alternating current transmission line for distance discrimination between faults occurring on the line, comprising a circuit breaker having electroresponsive tripping means for segregating portions of the line, means for deriving a first direct voltage having a magnitude dependent on the magnitude of the alternating line current, means for deriving a second direct voltage having a magnitude dependent on the magnitude of the alternating voltage, a capacitor unit, circuit means for energizing said capacitor unit in accordance with the first direct voltage to develop a capacitor voltage across the capacitor unit, means responsive to an increase in said first direct voltage for substantially discharging said capacitor unit, means responsive to the difference between the capacitor voltage and the second direct voltage for energizing the tripping means to trip the circuit breaker, and directional means responsive to the direction of power flow in the transmission line for preventing a circuit breaker tripping operation of the protective relaying assembly.

6. A protective relaying assembly designed to be energized in accordance with the alternating voltage and alternating line current of an alternating current transmission line for distance discrimination between faults occurring on the line, comprising a circuit breaker having electroresponsive tripping means for segregating portions of the line, means for deriving a first direct voltage having a magnitude dependent on the magnitude of the alternating line current, means for deriving a second direct voltage having a magnitude dependent on the magnitude of the alternating voltage, a capacitor unit, circuit means for energizing said capacitor unit in accordance with the first direct voltage to develop a capacitor voltage across the capacitor unit, means responsive to an increase in said first direct voltage for substantially discharging said capacitor unit, means responsive to the difference between the capacitor voltage and the second direct voltage for energizing the tripping means to trip the circuit breaker, and directional means responsive to the direction of power flow in the transmission line for preventing a circuit breaker tripping operation of the protective relaying assembly, and means responsive to said first direct voltage for initiating a prompt tripping operation of said circuit breaker.

7. A protective relaying assembly designed to be energized in accordance with the alternating voltage and alternating line current of an alternating current transmission line for distance discrimination between faults occuring on the line, comprising a circuit breaker having electroresponsive tripping means for segregating portions of the line, means for deriving a first direct voltage having a magnitude dependent on the magnitude of the alternating line current, means for deriving a second direct voltage having a magnitude dependent on the magnitude of the alternating voltage, a capacitor unit, a resistor, circuit means for energizing said capacitor unit through said resistor in accordance with the first direct voltage to develop a capacitor voltage across the capacitor unit, means responsive to an increase in said first direct voltage for substantially discharging said capacitor unit, said last-named means being effective when said first direct voltage reaches a substantially constant magnitude for charging said capacitor unit at a rate dependent on the magnitude of the first direct voltage, the resistance of said resistor and the capacitance of the capacitor, and means responsive to the difference between the capacitor voltage and the second direct voltage for energizing the tripping means to trip the circuit breaker.

References Cited by the Examiner

UNITED STATES PATENTS

| 2,551,022 | 5/1951 | Lerstrup | 317—49 |
| 2,959,716 | 11/1960 | Gordon | 317—49 X |
| 2,985,801 | 5/1961 | Warrington | 317—36 |
| 3,048,744 | 8/1962 | Warrington | 317—36 X |
| 3,155,879 | 11/1964 | Casey | 317—27 X |

SAMUEL BERNSTEIN, *Primary Examiner.*